United States Patent [19]

Kanesaka

[11] Patent Number: 5,456,240
[45] Date of Patent: Oct. 10, 1995

[54] ENGINE SYSTEM

[75] Inventor: Hiroshi Kanesaka, Kawasaki, Japan

[73] Assignee: Kanesaka Technical Institute Ltd., Kanagawa, Japan

[21] Appl. No.: 365,731

[22] Filed: Dec. 29, 1994

[51] Int. Cl.$^6$ .............................. F02B 39/04; F02B 47/08
[52] U.S. Cl. .................... 123/565; 60/605.2; 123/568
[58] Field of Search ..................... 60/605.2; 123/565, 123/568

[56] References Cited

U.S. PATENT DOCUMENTS

| | | | |
|---|---|---|---|
| 2,165,360 | 7/1939 | Elliott | 123/565 |
| 2,583,882 | 1/1952 | Ricardo | 123/565 |
| 2,600,983 | 6/1952 | Fell et al. | 123/565 |
| 2,624,849 | 1/1953 | Bennett-Powell | 123/565 |
| 5,203,311 | 4/1993 | Hitomi et al. | 60/605.2 |

FOREIGN PATENT DOCUMENTS 61-205345  9/1986  Japan .................... 60/605.2

*Primary Examiner*—Michael Koczo
*Attorney, Agent, or Firm*—Jones, Tullar & Cooper

[57] ABSTRACT

The air intake of a diesel engine used as a main power device is connected to a supercharger air outlet, wherein the supercharger is driven by an spark ignition engine. Discharged air from the supercharger is directed to an inlet system of said diesel engine for said main device by a pipe. Exhaust gas from the spark ignition engine is supplied between an inlet system of the supercharger and an inlet system of the diesel engine via an exhaust regulating valve. The regulating valve is regulated according to the operating condition of said diesel engine. Without deterioration in diesel engine startability and output, the engine system provides overall exhaust treatment which decreases especially NOx.

4 Claims, 1 Drawing Sheet

ENGINE SYSTEM

BACKGROUND OF THE INVENTION

1. Technical Field of the Invention

The present invention relates in general to an engine system which uses a large size diesel engine as the main power source for driving a vehicle such as a truck, bus etc, and also uses a small size spark ignition engine as an auxiliary power source for driving a supercharger for the diesel engine. This invention especially relates to such an engine system wherein exhaust gas from the spark ignition engine is delivered to the diesel engine where it is treated as exhaust gas recirculation (hereinafter called EGR), and is drawn into the diesel engine for further combustion.

2. Prior Art

Generally, when dealing with exhaust gas generated by the operation of diesel engines, it is known that NOx in the exhaust gas can be decreased if EGR is used. However, although many suggestions have been offered, under present circumstances, most of them have not been realized for practical use because of the following reasons.

First of all, the light oil which is a main fuel for diesel engines contains sulfur(S) which will produce $SO_3$ during combustion and $H_2SO_4$ by combination with moisture in the combustion gas, and these will wear and corrode cylinder walls and other engine parts. However, measures to solve this problem are still incomplete.

Another problem is that ashes in the exhaust gas of a diesel engine are drawn into the engine by EGR and work their way between cams and tappets or piston rings and cylinder walls, producing increased abrasion in these areas. However, this problem doesn't have an effective solution.

Still another problem arises from the fact that it is desirable to cool the exhaust gas by an exhaust cooler during EGR, for such cooling is effective to produce a good EGR result by decreasing the combustion temperature. At the same time, however, this cooling promotes the production of $H_2SO_4$ in the exhaust gas, resulting in corrosion of the exhaust cooler, and also possibly increases wear and corrosion of the cylinder wall and other engine parts by cooled $H_2SO_4$. However, effective measures for reducing wear and corrosion by $H_2SO_4$ have not been found yet, as stated above.

With regard to NOx in the exhaust gas of the diesel engine, although remaining exhaust NOx is decreased to some degree by partial exhaust EGR as mentioned above, some NOx still remains in the discharged exhaust, and this NOx in the exhaust gas cannot be further decreased under the present circumstances.

A catalyst might be used to decrease NOx in an spark ignition engine; however, because the exhaust gas from a diesel engine contains oxygen, a catalyst which can remove NOx effectively and economically has not been introduced yet.

A further problem is that although the increase of maximum combustion pressure resulting from supercharging a diesel engine improves the mechanical load of the engine, it also produces an increase in NOx generation as a result of an increase in combustion temperature. If the compression ratio is decreased to solve the NOx problem, then engine starting becomes difficult, and generation of harmful white smoke immediately after the start will result. With the above situation, although a decrease of compression ratio to 11 or 14 can be effective, it has not succeeded under the present condition.

Research is continuing in an effort to design combustion chambers and combustion methods and to find catalysts which will effectively remove NOx from exhaust gases and prevent the corrosion and abrasion described above. However, this matter is not solved yet.

A still further problem with diesel engines, and the biggest problem when conducting EGR, is that the diesel engine output decreases with EGR.

On the other hand, as is generally known, the spark ignition engine, which uses fuels such as gasoline, propane gas, natural gas etc., doesn't contain sulfur, so that special measures to prevent wear and corrosion by $H_2SO_4$, as mentioned above,are not required. Furthermore, in addition to the use of EGR, NOx can be removed, along with other exhaust pollutants (CO, HC), by catalytic converter rhodium (CCRO). Therefore, the exhaust gas from an spark ignition engine contains almost no NOx.

SUMMARY OF THE INVENTION

An object of the present invention is to overcome the foregoing problems of exhaust gas treatment of diesel engines and to utilize the above-described advantages of the spark ignition engine.

The present invention is directed to an engine system for a vehicle, wherein a diesel engine is used for the main power source for vehicle driving etc., and an auxiliary spark ignition engine, which is independently operated from the main engine, is used for driving a supercharger for the main engine. The engine system overall achieves generally decreased NOx and decreased corrosive material in the exhaust, by directing treated exhaust from the spark ignition engine, which treatment is relatively easy and which contains little NOx, into the intake of the diesel engine.

The engine system of the present invention also facilitates the starting of the main device diesel engine by driving the main engine supercharger with the auxiliary device spark ignition engine. This produces supercharging of the discharged air to said diesel engine to not only decrease NOx, but to prevent the discharge of white smoke containing harmful components when starting with low temperature.

A purpose of the present invention is to offer an engine system in which it is possible to increase main device diesel engine output, while at the same time decreasing NOx, by adjusting the load of the auxiliary device spark ignition engine which drives the supercharger.

Furthermore, still another purpose of the present invention is to offer an engine system in which it is possible to get a higher output while further decreasing NOx and at the same time reducing the maximum combustion pressure in a diesel engine by allowing a decrease in the compression ratio of the diesel engine.

BRIEF DESCRIPTION OF THE DRAWING

The foregoing, and additional objects, features and advantages of the present invention will become apparent to those of skill in the art from the following detailed description of a preferred embodiment thereof, taken in conjunction with the accompanying drawing, in which.

DETAILED DESCRIPTION OF THE INVENTION

Figure 1:
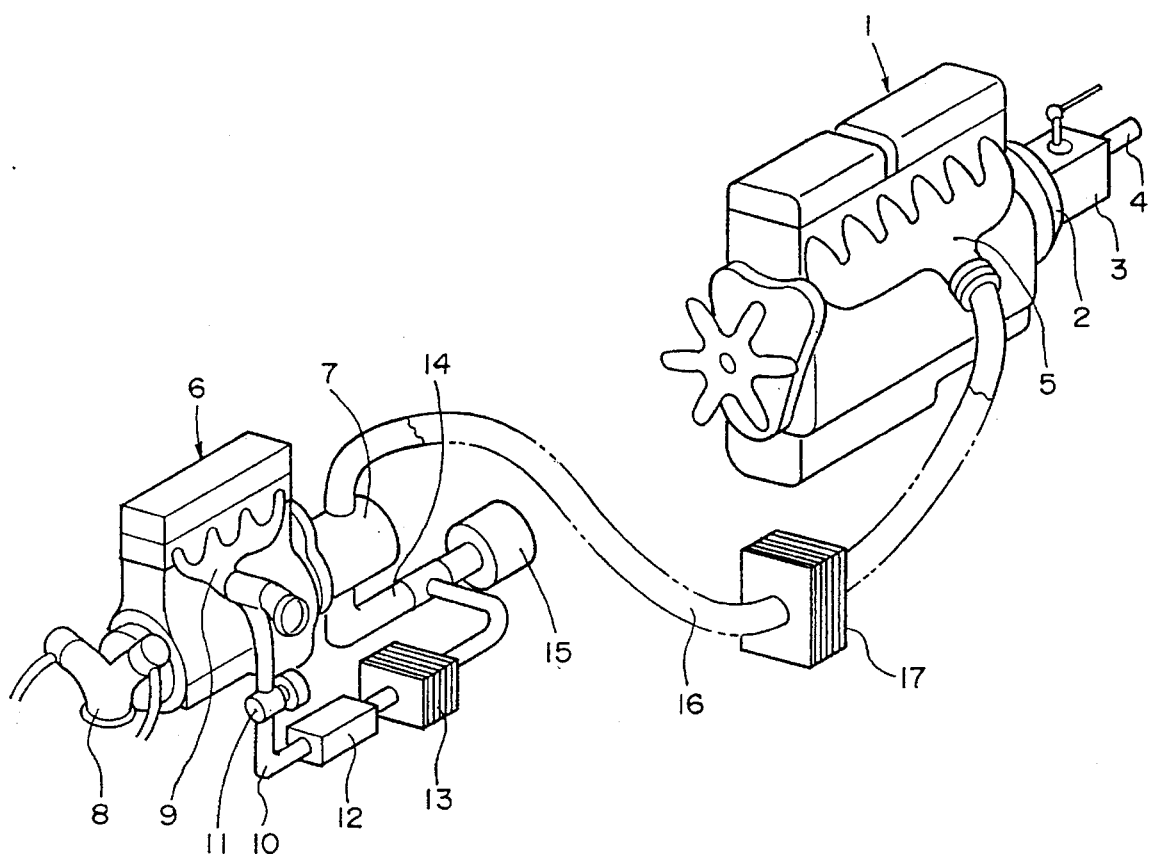
FIG. 1 is a general view of the engine system embodying the present invention.

The engine system of the present invention is explained in more detail with reference to FIG. 1, in which 1 is a diesel engine which may be a main power device installed in a truck, bus, or other vehicle for instance, with the output power being transmitted to axles (not shown in the drawing) via clutch 2, transmission 3 and driving shaft 4. The engine 1 includes an inlet manifold 5.

An spark ignition engine 6 is provided as an auxiliary power device to be operated independently from said main device diesel engine 1. The auxiliary engine is installed in the same vehicle and operates as a mechanical supercharger for the diesel engine 1. If desired, and according to the circumstances, engine 6 may also serve as an auxiliary driving device for such other equipment as a compressor which generates compressed air for vehicle brakes and for opening/closing doors or for driving a cooling fan. In the preferred example engine 6 drives a supercharger 7 connected to the front end of the crank shaft (not shown in the drawing) of the auxiliary device spark ignition engine 6. In addition, a compressor 8 is driven by rear end of the same crank shaft.

An EGR mechanism for the present invention is arranged as follows. Exhaust gas diverted from an exhaust manifold 9 of the spark ignition engine 6 is connected to flow by way of pipe 10 through an exhaust regulating valve 11, a catalytic converter 12 and an exhaust cooler 13 into the middle of a supercharger air inlet pipe 14. An air cleaner 15 is connected at the free end of pipe 14, with the opposite end of the pipe being connected to supercharger 7. The outlet of the supercharger is connected by pipe 16 through an inlet cooler 17 to inlet manifold 5 of the diesel engine.

By independently operating the main device diesel engine 1 and the auxiliary device spark ignition engine 6 with the connections described above, the aspiration efficiency of the diesel engine is improved. The pressurized air sent to the main device diesel engine 1 from the supercharger 7, which is driven by spark ignition engine 6, causes an increase in the torque and output of the diesel engine 1. In addition, when starting the main device diesel engine 1, the start becomes easier because of the improved inlet pressure. Furthermore, the increased air pressure decreases the amount of harmful formaldehyde and HC contained in the white smoke which is discharged at low temperature start and immediately after the start.

The operating condition of the main device diesel engine 1 will depend on the operation of the auxiliary device spark ignition engine 6. If the load on engine 6 is regulated, the inlet pressure at the diesel engine from the supercharger 7 is also regulated and therefore the output of the main device diesel engine 1 can be increased. Especially in cases where the main device diesel engine 1 is used for vehicles, the rotation speed and the load of the auxiliary device spark ignition engine 6 can be varied as needed to provide required low speed and high torque operation regardless of the rotational speed of the main device diesel engine 1.

When performing EGR for the purpose of NOx decrease in the exhaust gas from the main diesel engine 1, part or all of the exhaust gas produced by the auxiliary device spark ignition engine 6 is supplied to the supercharger 7 through pipe 10 by opening the exhaust regulating valve 11. The exhaust from manifold 9 is supplied to supercharger 7 by way of inlet tube 14 from pipe 10 by way of exhaust regulating valve 11, catalytic converter 12 and exhaust cooler 13. The exhaust from the spark ignition engine, which contains little NOx, is mixed with air from air cleaner 15 and is supplied to supercharger 7. The supercharger compresses the exhaust gas and supplies it by way of pipe 16 and inlet cooler 17 into the main device diesel engine 1, with the result that the exhaust from engine 6 is recirculated through the diesel engine. The recirculated exhaust is regulated by valve 11 in accordance with the desired operating condition of the diesel engine to provide control of the engine. Further, the load on the auxiliary engine, and thus its speed, may be regulated to thereby change the pressure of the air discharged by the supercharger. This, in turn, also changes the operation of the diesel engine, and allows its output to be regulated.

The amount of NOx can be reduced in the diesel exhaust by reducing the compression ratio of the main engine 1 to, for example, between 10 and 14 to 1. This can be done in the present system because of the supercharged air supplied to the intake 5 of the main engine 1.

Although the invention has been described in terms of a preferred embodiment, it will be apparent that variations may be made without departing from the true spirit and scope thereof, as set out in the following claims.

What is claimed is:

1. An engine system, comprising:

a main device diesel engine;

an auxiliary device spark ignition engine;

a supercharger connected to and driven by said auxiliary engine;

an air inlet leading to said supercharger;

a supercharger outlet for discharging air under pressure from said supercharger;

an inlet system for said main device diesel engine for receiving air from said supercharger outlet; and means supplying exhaust gas from said spark ignition engine to said air inlet of said supercharger to thereby supply spark ignition engine exhaust to the inlet system of said diesel engine.

2. The engine system as claimed in claim 1 further including an exhaust regulating valve connected between said auxiliary device spark ignition engine and said inlet system of said diesel engine, the regulating valve being regulated according to an operating condition of said diesel engine.

3. The engine system as claimed in claim 1 further including means regulating a load of said auxiliary device spark ignition engine, whereby discharged air pressure from said supercharger is changed and the output of the main device diesel engine is regulated.

4. The engine system as claimed in claim 1 wherein the compression ratio of said main device diesel engine is between 10 and 14.

* * * * *